United States Patent
Cabrera Escandell et al.

(10) Patent No.: US 9,232,027 B2
(45) Date of Patent: Jan. 5, 2016

(54) TCP CONNECTION RESOURCE DIVERSITY USING TUNABLE GEOMETRIC SERIES

(75) Inventors: Marco A. Cabrera Escandell, Bellevue, WA (US); Tommy L. McLane, Hutto, TX (US)

(73) Assignee: International Business Machines Corporation, Armonk, NY (US)

( * ) Notice: Subject to any disclaimer, the term of this patent is extended or adjusted under 35 U.S.C. 154(b) by 380 days.

(21) Appl. No.: 12/197,807

(22) Filed: Aug. 25, 2008

(65) Prior Publication Data

US 2010/0046538 A1 Feb. 25, 2010

(51) Int. Cl.
*H04L 12/56* (2006.01)
*H04L 29/06* (2006.01)

(52) U.S. Cl.
CPC .............. *H04L 69/16* (2013.01); *H04L 69/162* (2013.01); *H04L 69/163* (2013.01)

(58) Field of Classification Search
None
See application file for complete search history.

(56) References Cited

U.S. PATENT DOCUMENTS

| | | | |
|---|---|---|---|
| 5,959,973 A | 9/1999 | Meurisse et al. | |
| 6,075,769 A | 6/2000 | Ghanwani et al. | |
| 6,400,686 B1 | 6/2002 | Ghanwani et al. | |
| 6,788,646 B1 * | 9/2004 | Fodor et al. | 370/230 |
| 7,102,997 B2 | 9/2006 | Sultan et al. | |
| 7,137,144 B1 * | 11/2006 | Attwood et al. | 726/13 |
| 7,484,011 B1 * | 1/2009 | Agasaveeran et al. | 709/250 |
| 7,814,542 B1 * | 10/2010 | Day | 726/22 |
| 2005/0265233 A1 * | 12/2005 | Johnson et al. | 370/229 |

* cited by examiner

*Primary Examiner* — Steve Young
(74) *Attorney, Agent, or Firm* — Damion Josephs; Robert C. Rolnik

(57) ABSTRACT

Disclosed is a computer implemented method and apparatus for handling transport control protocol connections. The local host receives a transport control protocol socket connection request from a host. By subtracting a current port connection from maximum port connections to form a difference, the local host calculates the threshold based the difference divided by the tunable divisor, the tunable divisor not equal to one. The local host then determines whether the current port connections exceeds the threshold. By responding to a determination that the current port connections exceed the threshold, the local host blocks the transport control protocol socket request based on the TCP socket connection request.

11 Claims, 5 Drawing Sheets

FIG. 1A
(PRIOR ART)

| HOST | MAXIMUM_PORT_CONNECTIONS | CURRENT_PORT_CONNECTIONS | CURRENT_HOST_CONNECTIONS |
|---|---|---|---|
| 1 | 1000 | 500 | 500 |
| 2 | 1000 | 750 | 250 |
| 3 | 1000 | 875 | 125 |
| 4 | 1000 | 938 | 63 |
| 5 | 1000 | 970 | 32 |
| 6 | 1000 | 986 | 16 |
| 7 | 1000 | 994 | 8 |
| 8 | 1000 | 998 | 4 |
| 9 | 1000 | 999 | 1 |
| 10 | 1000 | 1000 | 1 |

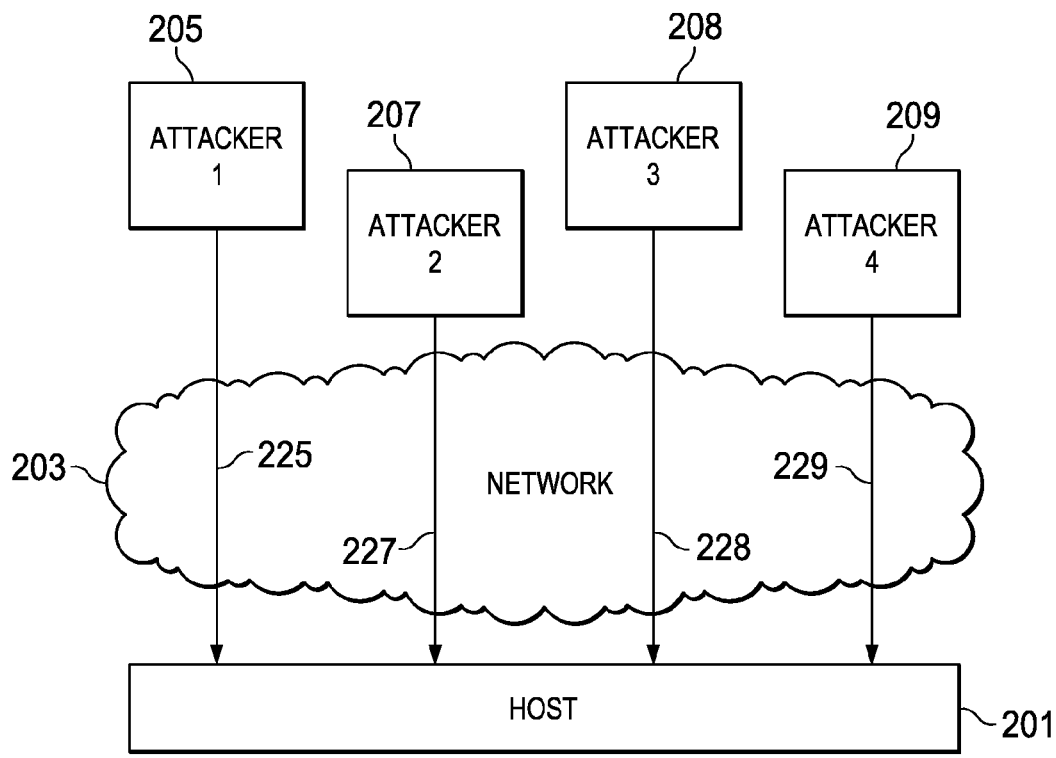
FIG. 2
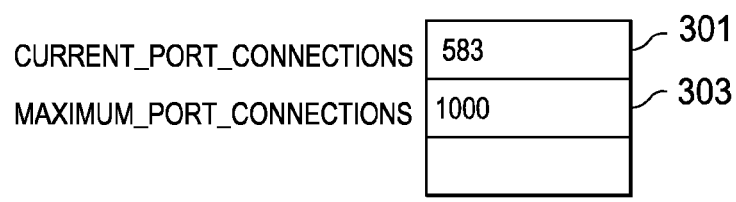
FIG. 3A
| HOST | CURRENT_HOST_CONNECTIONS |
|---|---|
| HOST 192.168.0.1 | 433 |
| HOST 192.168.0.2 | 250 |
| | |
| | |
FIG. 3B

TCP CONNECTION RESOURCE DIVERSITY USING TUNABLE GEOMETRIC SERIES

BACKGROUND OF THE INVENTION

1. Field of the Invention

The present invention relates generally to a computer implemented method, data processing system, and computer program product for connecting computers within a packet network. More specifically, the present invention relates to throttling to allow connections to one or more addresses of a data processing system in manner to preserve system resources and boost diversity among hosts allowed to connect to a local host.

2. Description of the Related Art

Modern data processing systems rely on packet switched networks to transmit data in various forms. One computer may exchange packets with a second computer using the transport control protocol and/or internet protocol (TCP/IP) set of protocols. These protocols permit a computer to respond to transport control protocol (TCP) socket connection requests by either accepting and allowing a connection or, alternatively, blocking the connection. A TCP socket connection request is a received synchronization packet from the host, having a synchronous idle character (SYN) flag set to one. SYN or SYN flag is a bit of a packet used to identify that the packet is a request for connection. Because a computer has finite resources, and each accepted request occupies a portion of the finite resources, a computer may not necessarily be able to handle all connection requests made to the computer. Resources include, for example, memory, processor time, disk space, etc.

Responding to a request, a computer may fork or otherwise execute additional processes to handle accepted connection requests. Once a computer accepts sufficient connection requests so many resources may be occupied that the computer becomes unusable because of competition among the resultant processes for resources. Some conditions that may cause this issue can include disk thrashing, deadlock, among others.

Prior art systems were developed that cause a computer to limit accepted connections such that no single requester or host is permitted to occupy 50% of the maximum port connections of the computer. A second host, in such prior art systems, is permitted to occupy 25% of the maximum port connections. Successive requesters are accordingly allowed connections based on ever-diminishing thresholds or caps for each host. FIG. 1A illustrates the progression of a hypothetical 10 requesters in a system having a limit of 1000 maximum port connections for a monitored port(s). The diversity of such a system is limited to 10 hosts before the maximum established connections are reached.

The prior art systems allow connections when the following inequality is true: MAXIMUM_PORT_CONNECTIONS-CURRENT_PORT_CONNECTIONS≥CURRENT_HOST_CONNECTIONS When an incoming TCP socket connection request arrives on a port, the computer tracks the number of connections used by a particular Internet Protocol (IP) address on a particular TCP port. The source IP address in a TCP socket connection request is the requesting host, while the targeted TCP port is the monitored port. Current port connections a number, for example, CURRENT_PORT_CONNECTIONS, that is the dynamically maintained value of existing port connections established at the local host for a host. A host an abstract concept of a sender for packets on a network. This abstraction permits a single computer to operate as a sender for packets that correspond to one or more hosts. A host may be a computer identification corresponding to an IP address associated with a source address field of a packet. Thus, a computer having an IP address of 192.168.0.1 can be a host. The same computer can also provide packets having alternate IP addresses, for example, 192.168.0.2. Nevertheless, a more typical configuration is that a single computer may correspond to a single host.

A maximum port connections is a maximum number of connections that a computer may support for a monitored port or grouping of monitored ports. A monitored port or group of monitored ports are ports that a limit is set applicable to a number of TCP connection requests that can be concurrently allowed. MAXIMUM_PORT_CONNECTIONS is a convenient name in the formula above for maximum port connections. A TCP connection request that is allowed at a computer is in an active open state. A system administrator can set the maximum port connections.

The current host connections, or CURRENT_HOST_CONNECTIONS as used in the formula above, is a number of connections established to a host. Accordingly, in the examples given above, the host 192.168.0.1 can have 500 connections, while the host 192.168.0.2 can have 250 connections. Accordingly, the prior art may limit, in the instance where MAXIMUM_PORT_CONNECTIONS is 1000 such that the sum of current port connections of 192.168.0.1 and 192.168.0.2 with additional hosts are limited to 1000 before the computer or local host blocks additional connections.

As can be seen in this example, the prior art computer progressively limits the allowed number of connections for hosts until host #10 may be allowed a single connection. If a denial of service attack were to be mounted against the computer, the most computers needed to occupy all the maximum port connections is 10 in this example. The declining proportions shown here is the most rapid reduction in proportion of allowed connections for successive attackers or hosts allowed by the prior art. It may be advantageous to diminish the proportion of allowed connections as a function of additional attacker/hosts as compared a proportion allowed by the prior art.

SUMMARY OF THE INVENTION

The present invention provides a computer implemented method and apparatus for handling transport control protocol connections. The local host receives a transport control protocol (TCP) socket connection request from a host. By subtracting a current port connection from maximum port connections to form a difference, the local host calculates the threshold based the difference divided by the tunable divisor, the tunable divisor not equal to one. The local host then determines whether the current port connections exceeds the threshold. By responding to a determination that the current port connections exceed the threshold, the local host blocks the transport control protocol socket request based on the TCP socket connection request.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 1A is a table showing an example of how hosts in the prior art are limited in connections allowed;

FIG. 2 shows a local host computer operating with connections to one or more hosts in accordance with an illustrative embodiment of the invention;

FIG. 3A shows a policy managed by a variable and a system tunable in accordance with an illustrative embodiment of the invention;

FIG. 3B shows a table that a local host may use to determine whether to allow a TCP socket connection request in accordance with an illustrative embodiment of the invention;

DETAILED DESCRIPTION OF THE PREFERRED EMBODIMENT

Figure 1B:
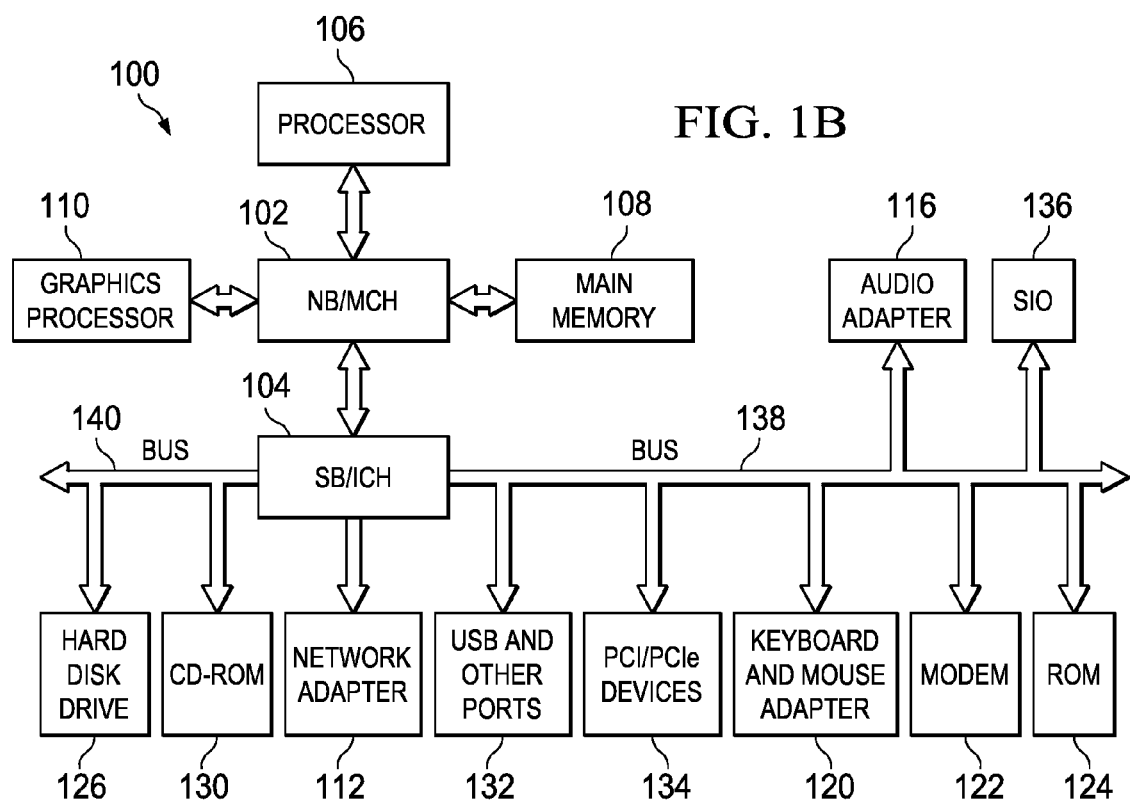
FIG. 1B is a data processing system in accordance with an illustrative embodiment of the invention.

With reference now to the figures and in particular with reference to FIG. 1B, a block diagram of a data processing system is shown in which aspects of an illustrative embodiment may be implemented. Data processing system 100 is an example of a computer, in which code or instructions implementing the processes of the present invention may be located. In the depicted example, data processing system 100 employs a hub architecture including a north bridge and memory controller hub (NB/MCH) 102 and a south bridge and input/output (I/O) controller hub (SB/ICH) 104. Processor 106, main memory 108, and graphics processor 110 connect to north bridge and memory controller hub 102. Graphics processor 110 may connect to the NB/MCH through an accelerated graphics port (AGP), for example.

In the depicted example, local area network (LAN) adapter 112 connects to south bridge and I/O controller hub 104 and audio adapter 116, keyboard and mouse adapter 120, modem 122, read only memory (ROM) 124, hard disk drive (HDD) 126, CD-ROM drive 130, universal serial bus (USB) ports and other communications ports 132, and PCI/PCIe devices 134 connect to south bridge and I/O controller hub 104 through bus 138 and bus 140. PCI/PCIe devices may include, for example, Ethernet adapters, add-in cards, and PC cards for notebook computers. PCI uses a card bus controller, while PCIe does not. ROM 124 may be, for example, a flash binary input/output system (BIOS). Hard disk drive 126 and CD-ROM drive 130 may use, for example, an integrated drive electronics (IDE) or serial advanced technology attachment (SATA) interface. A super I/O (SIO) device 136 may be connected to south bridge and I/O controller hub 104.

An operating system runs on processor 106, coordinates, and provides control of various components within data processing system 100 in FIG. 1B. The operating system may be a commercially available operating system such as Microsoft® Windows® XP. Microsoft and Windows are trademarks of Microsoft Corporation in the United States, other countries, or both. An object oriented programming system, such as the Java™ programming system, may run in conjunction with the operating system and provides calls to the operating system from Java™ programs or applications executing on data processing system 100. Java™ is a trademark of Sun Microsystems, Inc. in the United States, other countries, or both.

Instructions for the operating system, the object-oriented programming system, and applications or programs are located on storage devices, such as hard disk drive 126, and may be loaded into main memory 108 for execution by processor 106. The processes of the present invention can be performed by processor 106 using computer implemented instructions, which may be located in a memory such as, for example, main memory 108, read only memory 124, or in one or more peripheral devices.

Those of ordinary skill in the art will appreciate that the hardware in FIG. 1B may vary depending on the implementation. Other internal hardware or peripheral devices, such as flash memory, equivalent non-volatile memory, and the like, may be used in addition to or in place of the hardware depicted in FIG. 1B. In addition, the processes of the illustrative embodiments may be applied to a multiprocessor data processing system.

In some illustrative examples, data processing system 100 may be a personal digital assistant (PDA), which is configured with flash memory to provide non-volatile memory for storing operating system files and/or user-generated data. A bus system may be comprised of one or more buses, such as a system bus, an I/O bus and a PCI bus. Of course, the bus system may be implemented using any type of communications fabric or architecture that provides for a transfer of data between different components or devices attached to the fabric or architecture. A communication unit may include one or more devices used to transmit and receive data, such as a modem or a network adapter. A memory may be, for example, main memory 108 or a cache such as found in north bridge and memory controller hub 102. A processing unit may include one or more processors or CPUs. The depicted example in FIG. 1B is not meant to imply architectural limitations. For example, data processing system 100 also may be a tablet computer, laptop computer, or telephone device in addition to taking the form of a PDA.

The terminology used herein is for the purpose of describing particular embodiments only and is not intended to be limiting of the invention. As used herein, the singular forms "a", "an", and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module", or "system." Furthermore, the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The aspects of the illustrative embodiments provide a computer implemented method, data processing system, and computer program product for tuning the degree to which subsequent connection correspondents or hosts are allowed to establish connections to a local host. One or more embodiments below may permit more aggressive limiting of connections allocated to a specific host in order to broaden the number of hosts that may be permitted connections, as compared to the prior art.

FIG. 2 shows a local host computer operating with connections to one or more hosts in accordance with an illustrative embodiment of the invention. Host 201 is a local host that receives, allows, and/or blocks Transport Control Protocol (TCP) socket connection requests from other hosts. Host 201 can be, for example, data processing system 100 of FIG. 1B. Host 201 may attach to packet network 203 in order to establish TCP socket connections into an allowed active state. Hosts can be remote from host 201 such that the hosts make connections to host 201 via network 203. Hosts may be, for example, attacker 1 205, attacker 2 207, attacker 3 208, and attacker 4 209. Hosts may be malevolent or benign.

For each host, a number of current host connections can be established to the local host. The local host is, for example, host 201. An illustrative embodiment can suppress a number of current host connections with host 201 on a per-host basis. A diversity of hosts may be increased as an inverse function of allowed connections per host on a resource limited local host. Groupings of one or more connections on a host to local host basis are shown for attacker 1 205, attacker 2 207, attacker 3 208, and attacker 4 209 as attacker 1 connections 225, attacker 2 connections 227, attacker 3 connections 228 and attacker 4 connections 229, respectively. It is appreciated that due to the packet switched nature of network 203, packets for each connection can travel varying routes to reach host 201, and as such, links shown in FIG. 2 merely approximate the varying paths followed by packets in one or more connections.

It can be appreciated that although FIG. 2 depicts hosts as separate and distinct, each host among attacker 1-attacker 4 can be implemented by an instance of a data processing system that transmits packets having multiple source IP addresses, such as, for example, data processing system 100 of FIG. 1B.

FIG. 3A shows a policy managed by a variable and a system tunable in accordance with an illustrative embodiment of the invention.

CURRENT_PORT_CONNECTIONS can be a user-friendly name for a variable holding current port connections 301 in an active open state between a local host and all hosts having active open connections. Current port connections 301 may be with respect to a monitored port or multiple ports monitored together. Accordingly, the illustrative embodiment may provide a current port connections value for each port monitored or group of ports that adhere to a common policy.

Similarly, an administrator may set a maximum port connections 303 value for each policy. As described above, maximum port connections 303 is used by a system administrator to set a maximum limit of allowed concurrent connections at a port or group of ports. Accordingly, a policy is a data structure that records maximum port connections for at least one internet protocol address and/or TCP port. The data structure may be, for example, a dynamic array.

FIG. 3B shows a table that a local host may use to determine whether to allow a TCP socket connection request in accordance with an illustrative embodiment of the invention. The table is made up of a row for each host that has at least one active open connection to the local host. For example, host 192.168.0.1 305 may correspond to attacker 205 of FIG. 2. Current host connections 315 may be 433 for host 192.168.0.1 305. Such host connections are shown, for example, as attacker 1 connections 225 in FIG. 2. Similarly, current host connections 317 may be 250 for host 192.168.0.2 307. As may be appreciated, current host connections may adjust in a dynamic manner in accordance to the opening and closing of connections between local host 201 and attacker 205.

Figure 4:
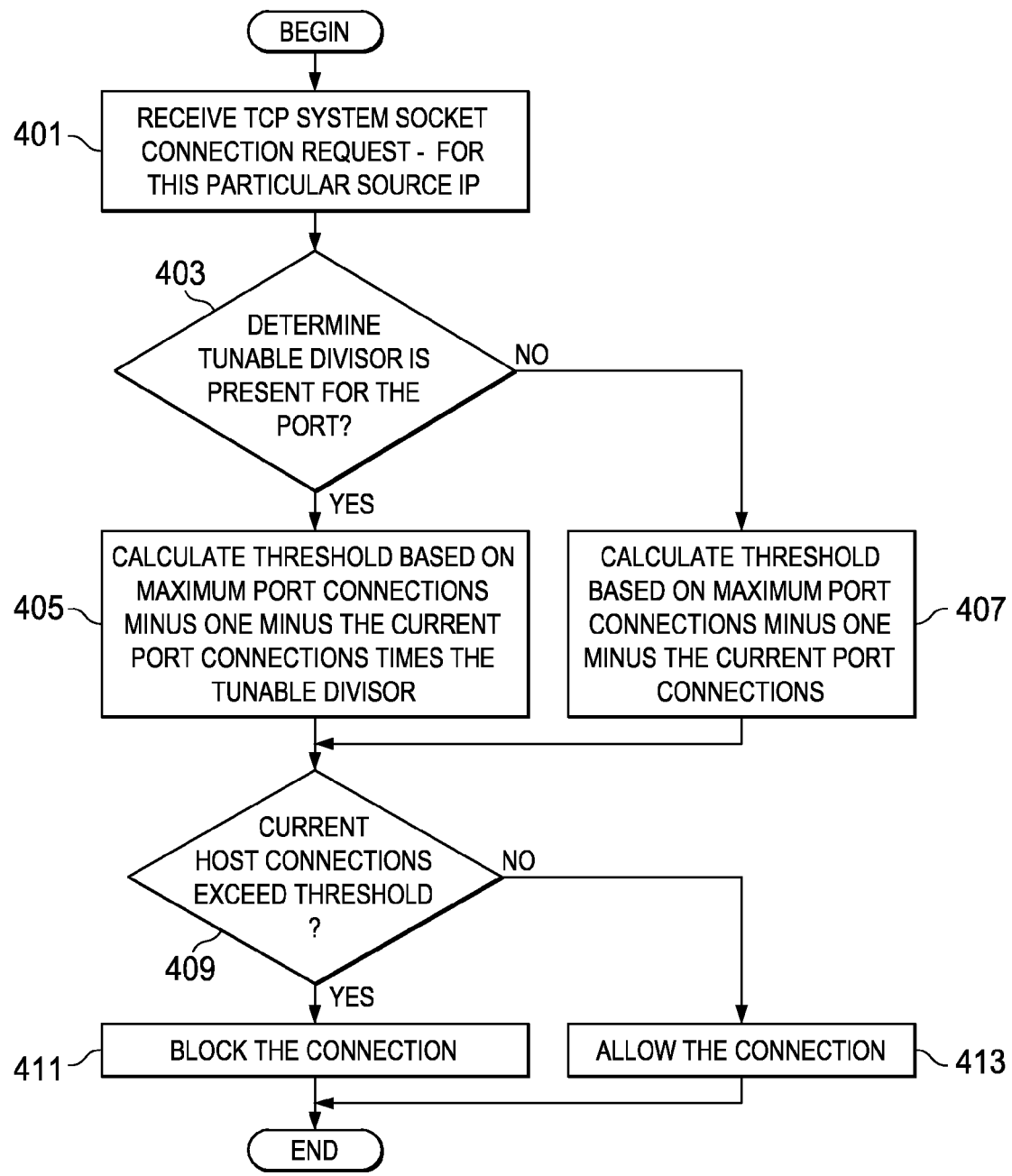
FIG. 4 is a flowchart of steps performed in a local host, in accordance with an illustrative embodiment of the invention.

FIG. 4 is a flowchart of steps performed in a local host, in accordance with an illustrative embodiment of the invention. Initially, the local host receives a TCP socket connection request from a host (step 401). Next, the local host determines whether a tunable divisor is present for the host (step 403). A tunable divisor is a number other than 1. The tunable divisor may be set by a system administrator.

Accordingly, a tunable divisor may be used to create a threshold, given by the left hand side of the following inequality:

$$\frac{\text{MAXIMUM PORT CONNECTIONS} - \text{CURRENT PORT CONNECTIONS} - 1}{\text{TUNABLE DIVISOR}} > \text{CURRENT\_HOST\_CONNECTIONS}$$

A threshold is a value calculated based on a maximum port connections minus the current port connections divided by the tunable divisor. A positive determination at step 403 may cause the local host to calculate the threshold based on the maximum port connections minus the current port connections times the tunable divisor (step 405). The local host may perform step 405 by subtracting a current port connections from a maximum port connections to form a difference. A difference is a difference between at least two numbers. The local host may perform step 405 by calculating the threshold based on the difference divided by the tunable divisor.

Next, the local host may determine if current host connections exceed the threshold (step 409). A negative result to step 403 may cause the local host to calculate a threshold based on a maximum port connections minus the current port connections (step 407). Processing may continue at step 409.

The current host connections is the number of active open connections for a host as defined by a combined IP address and TCP port of the TCP socket connection request.

Accordingly, a positive result at step 409 may cause the local host to block the connection request (step 411). Blocking the TCP socket connection request is based on the TCP socket connection request. The event of blocking may be logged. Accordingly, a blocked TCP socket connection is an event that occurs in response to a determination that the current host connections exceed an applicable threshold. The local host may drop the TCP socket connection request, or respond by transmitting a close/fin packet. The FIN packet is a TCP packet having the FIN bit set. Processing may terminate thereafter.

In contrast, a negative result at step 409 may cause the local host to allow the TCP socket connection request (step 413). Allowing the TCP socket connection request may include updating variables or statistics to reflect a revised current host connections. Accordingly, the local host may update current port connections 301 and current host connections 315 applicable to the requesting host of FIGS. 3A and 3B. Processing may terminate thereafter.

Figure 5:
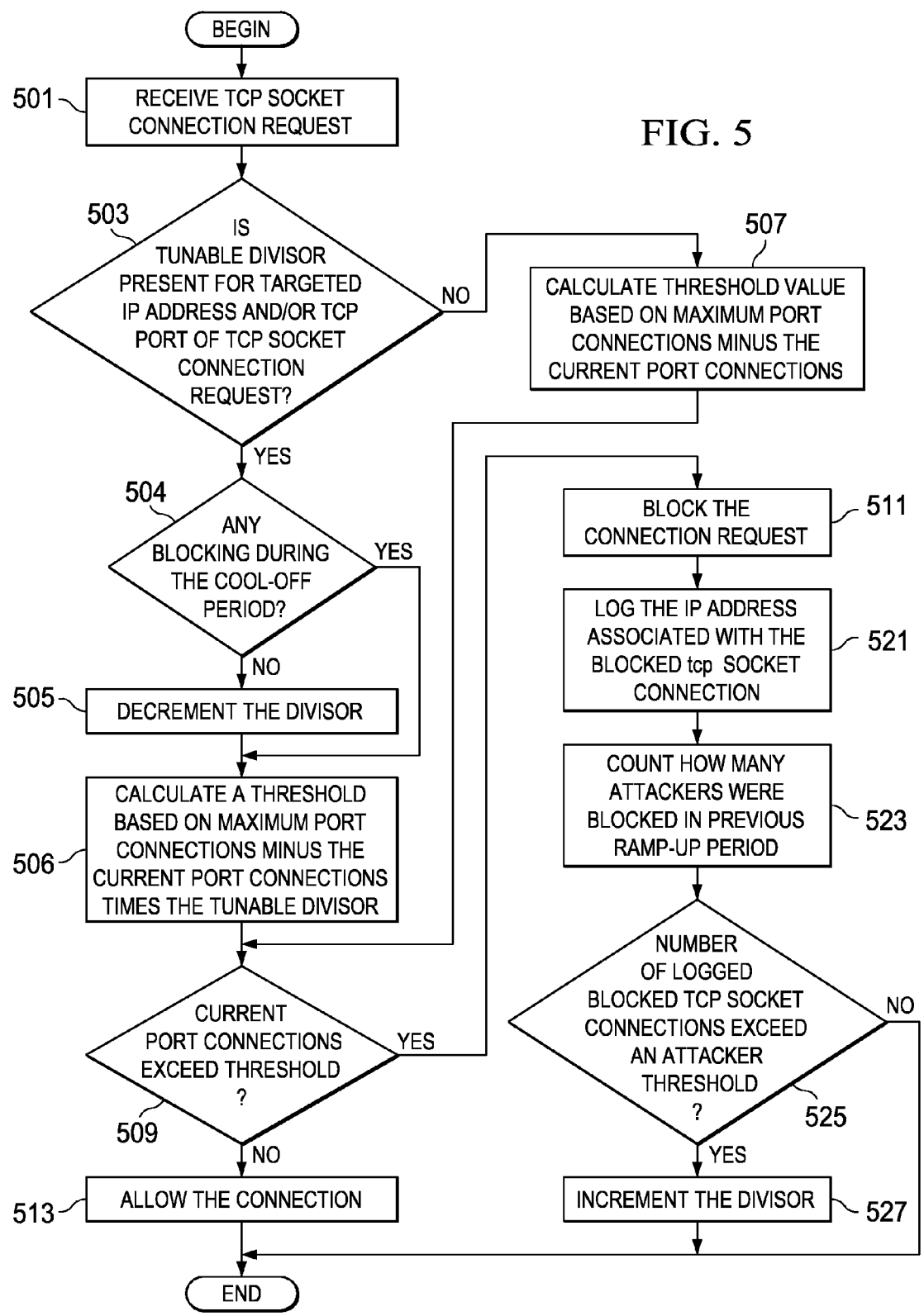
FIG. 5 is a flowchart of steps to block connections and adjust the rate of blocking connections based, in part, on recent periods of blocking or absence of blocking in accordance with an illustrative embodiment of the invention.

FIG. 5 is a flowchart of steps to block connections and adjust the rate of blocking connections based, in part, on recent periods of blocking or absence of blocking in accordance with an illustrative embodiment of the invention. Initially, a local host may receive a TCP socket connection request (step 501). The TCP socket connection request may be a packet carrying a source IP address. Next, the local host may determine whether a tunable divisor is present for the targeted IP address and/or TCP port of the TCP socket connection request (step 503). A negative determination at step 503 may cause the local host to calculate a threshold value based on a maximum port connections minus the current port connections (step 507).

Alternatively, a positive determination at step 503 may cause the local host to determine whether any blocking occurred during a cool-off period (step 504). A cool-off period is a period used to determine if a potential denial of service attack is abating. Accordingly, the cool-off period can be a system administrator set value between 100 ms and 99999 ms. Moreover, the absence of a blocked TCP socket connection during a cool-off period can signal that no further hostile behavior is occurring towards the local host. Thus, the absence of a blocked TCP socket connection during a cool-off period is an event that can signal an opportunity to decrease the divisor, and relax the threshold.

A negative determination at step 504 may cause the local host to decrement the divisor (step 505). Decrementing the divisor may include the local host multiplying the divisor times a fraction, for example, 0.9. Alternatively, the local host may subtract a value from the divisor, for example, 0.1. Following this step, or a positive determination at step 504, the local host may calculate a threshold based on the maximum port connections minus the current port connections and divided by the tunable divisor (step 506). Next, after steps 506 or 507, the local host may determine if the current port connections exceed the threshold (step 509). If not, the local host may allow the connection (step 513). Allowing the connection causes connection to transition to active open state.

In contrast, a positive determination at step 509 may cause the local host to block the connection request (step 511). This step may include logging a blocked TCP socket connection. A blocked TCP socket connection is an event that occurs when the local host blocks the TCP socket connection. Accordingly, the local host may log the IP address associated with the blocked TCP socket connection (step 521). This step may include logging the time, source IP address, and other features of the event. The source IP address may be an attacker, and such an IP address may be counted toward a number of attackers active during a period.

Next, the local host may count how many attackers were blocked during a ramp-up period to form an attacker count (step 523). The local host may determine if the number of logged blocked TCP socket connections exceed an attacker threshold (step 525). The number of logged blocked TCP socket connections is a number of TCP socket connection requests that the local host blocked during a ramp-up period. The ramp up period is a period use to determine whether a number of hosts requesting connections exceeds an attacker threshold. The attacker threshold is a number that operates as a warning or signal when reached or exceeded by a count of distinct IP addresses read from TCP socket connection requests during the ramp-up period. If the number of logged blocked TCP socket connections exceeds the attacker threshold, the local host may increment the divisor (step 527). Incrementing the divisor may include multiplying the divisor by a number between 1 and 3. Processing may terminate thereafter, or after a negative outcome to step 525.

The illustrative embodiments permit blocking of connections at a lower proportional threshold to maximum port connections for attacking hosts. As a result, more hosts may be allowed at least one connection to the local host before a maximum port connections is reached with respect to active open TCP/IP connections.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories, which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for handling transport control protocol connections, the method comprising:
   receiving by a first host, via a network, a first transport control protocol (TCP) socket connection request from a second host;
   subtracting, by the first host, a first current port connections from a maximum port connections to form a first difference;
   calculating a threshold based on the first difference divided by a tunable divisor, the tunable divisor not equal to one;
   determining whether the first current port connections exceeds the threshold;
   responsive to a determination that the first current port connections exceeds the threshold, blocking the first transport control protocol socket connection request based on the first TCP socket connection request;
   responsive to blocking the first TCP socket connection request, logging a blocked TCP socket connection;
   determining whether a number of logged blocked TCP socket connections exceed an attacker threshold during a ramp-up period;
   responsive to a determination that the number of logged blocked TCP socket connections exceed an attacker threshold during a ramp-up period, incrementing the tunable divisor;
   logging an absence of a blocked TCP socket connection during a cool-off period;
   responsive to logging absence of the blocked TCP socket connection during the cool-off period, decrementing the tunable divisor by multiplying the tunable divisor by a number between 0 and 1;
   recalculating the threshold based on a second current port connections subtracted from the maximum port connections, to form a second difference, dividing the second difference by the tunable divisor;

determining that the second current port connections do not exceed the threshold, and in response, allowing a second TCP socket connection request to form a connection to the second host, wherein the threshold is made larger than the threshold prior to recalculating.

2. The computer implemented method of claim 1, wherein the maximum port connections is a maximum number of connections for at least one internet protocol address of the first host.

3. The computer implemented method of claim 1, wherein incrementing the tunable divisor comprises multiplying the tunable divisor by a number between 1 and 3.

4. The computer implemented method of claim 1, wherein the TCP socket connection request is a received synchronization packet from the second host, having a SYN flag set to one.

5. A computer program product for handling transport control protocol connections, the computer program product comprising: a computer usable medium selected from the group consisting of a semiconductor device, a portable computer diskette, a hard disk, a random access memory, a read-only memory, an erasable programmable read-only memory, a portable compact disc read-only memory, an optical storage device, and a magnetic storage device, the computer usable medium having computer usable program code embodied therewith, the computer program product comprising:

computer usable program code configured to receive by a first host, via a network, a transport control protocol (TCP) socket connection request from a second host;

computer usable program code configured to subtract, by the first host, a first current port connections from a maximum port connections to form a first difference;

computer usable program code configured to calculate a threshold based on the first difference divided by a tunable divisor, the tunable divisor not equal to one;

computer usable program code configured to determine whether the first current port connections exceeds the threshold;

computer usable program code configured to block the first transport control protocol socket connection request based on the first TCP socket connection request, responsive to a determination that the first current port connections exceeds the threshold;

computer usable program code configured to log a blocked TCP socket connection, responsive to blocking the first TCP socket connection request;

computer usable program code configured to determine whether a number of logged blocked TCP socket connections exceed an attacker threshold during a ramp-up period;

computer usable program code configured to increment the tunable divisor, responsive to a determination that the number of logged blocked TCP socket connections exceed an attacker threshold during a ramp-up period;

computer usable program code configured to log an absence of a blocked TCP socket connection during a cool-off period and in response, to decrement the tunable divisor by multiplying the tunable divisor by a number between 0 and 1;

computer usable program code configured to recalculate the threshold based on a second current port connections subtracted from the maximum port connections, to form a second difference, and divide the second difference by the tunable divisor; and computer usable program code configured to determine that the second current port connections do not exceed the threshold, and in response, to allow a second TCP socket connection request to form a connection to the second host wherein the threshold is made larger than the threshold prior to recalculating.

6. The computer program product of claim 5, wherein the maximum port connections is a maximum number of connections for at least one internet protocol address of the first host.

7. The computer program product of claim 5, wherein computer usable program code configured to increment the tunable divisor comprises computer usable program code configured to multiply the tunable divisor by a number between 1 and 3.

8. The computer program product of claim 5, wherein the TCP socket connection request is a received synchronization packet from the second host, having a SYN flag set to one.

9. A data processing system comprising:

a bus;

a storage device connected to the bus, wherein computer usable code is located in the storage device;

a communication unit connected to the bus;

a processing unit connected to the bus, wherein the processing unit executes the computer usable code for handling transport control protocol connections, wherein the processing unit executes the computer usable program code to receive by a first host, via a network, a transport control protocol (TCP) socket connection request from a second host; subtract, by the first host, a first current port connections from a maximum port connections to form a first difference; calculate a threshold based on the first difference divided by a tunable divisor, the tunable divisor not equal to one; determine whether the first current port connections exceeds the threshold; block a first transport control protocol socket connection request based on the first TCP socket connection request, responsive to a determination that the current port connections exceeds the threshold; computer usable code to log a blocked TCP socket connection, responsive to blocking the TCP socket connection request; determine whether a number of logged blocked TCP socket connections exceed an attacker threshold during a ramp-up period; increment the tunable divisor, responsive to a determination that the number of logged blocked TCP socket connections exceed an attacker threshold during a ramp-up period; log an absence of a blocked TCP socket connection during a cool-off period and in response, to decrement the tunable divisor by multiplying the tunable divisor by a number between 0 and 1; recalculate the threshold based on a second current port connections subtracted from the maximum port connections, to form a second difference, and divide the second difference by the tunable divisor; and determine that the second current port connections do not exceed the threshold, and in response, to allow a second TCP socket connection request to form a connection to the second host, wherein the threshold is made larger than the threshold prior to recalculating.

10. The data processing system claim 9, wherein the maximum port connections is a maximum number of connections for at least one interne protocol address of the first host.

11. The data processing system claim 9, wherein the processing unit further executes in executing the computer usable code to increment the tunable divisor the processing unit further executes computer usable code to multiply the tunable divisor by a number between 1 and 3.

* * * * *